(12) United States Patent
Kim et al.

(10) Patent No.: US 11,958,761 B2
(45) Date of Patent: Apr. 16, 2024

(54) HYDROGEN ISOTOPE ADSORBENT WITH DIFFERENTIAL BINDING PROPERTIES TO HYDROGEN ISOTOPES, MANUFACTURING METHOD THEREOF AND METHOD FOR SEPARATING HYDROGEN

(71) Applicant: POSTECH RESEARCH AND BUSINESS DEVELOPMENT FOUNDATION, Pohang-si (KR)

(72) Inventors: Hyo Joo Kim, Daegu (KR); Woo Yong Um, Yongin-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/089,004

(22) Filed: Dec. 27, 2022

(65) Prior Publication Data
US 2023/0202876 A1    Jun. 29, 2023

Related U.S. Application Data

(62) Division of application No. 17/592,799, filed on Feb. 4, 2022, now Pat. No. 11,685,671.

(30) Foreign Application Priority Data

Jul. 23, 2021 (KR) .................. 10-2021-0096843

(51) Int. Cl.
| | | |
|---|---|---|
| C02F 1/28 | (2023.01) | |
| B01J 20/10 | (2006.01) | |
| B01J 20/28 | (2006.01) | |
| B01J 20/30 | (2006.01) | |
| C03B 21/00 | (2006.01) | |
| C02F 101/00 | (2006.01) | |

(52) U.S. Cl.
CPC ............ *C02F 1/288* (2013.01); *B01J 20/103* (2013.01); *B01J 20/28057* (2013.01); *B01J 20/28071* (2013.01); *B01J 20/28083* (2013.01); *B01J 20/3085* (2013.01); *C03B 21/00* (2013.01); *C02F 2101/00* (2013.01); *C03B 2201/06* (2013.01); *C03B 2201/12* (2013.01)

(58) Field of Classification Search
CPC .... C02F 1/288; B01J 20/103; B01J 20/28057; B01J 20/28071; B01J 20/28083; B01J 20/3085; C03B 21/00
See application file for complete search history.

(56) References Cited

PUBLICATIONS

Kim, Chemical Affinity quantum sieving of fluorine for isotopic separation of tritium from radioactive wastewater, 2021, Korean Radioactive Waste Society, Conference (Year: 2021).*
Kim, Fluorine-functionalized mesoporous silica for selective removal of tritium from nuclear waste water, 2020, Radioactive Waste Society, Conference (Year: 2020).*

* cited by examiner

*Primary Examiner* — James A Fiorito
(74) *Attorney, Agent, or Firm* — LEX IP MEISTER, PLLC

(57) ABSTRACT

Provided is a hydrogen isotope adsorbent with differential binding properties and including mesoporous silica doped with fluorine.

5 Claims, 5 Drawing Sheets

Analysis results of each sample before and after calcination (A) XRD (B) FTIR

[FIG. 1]
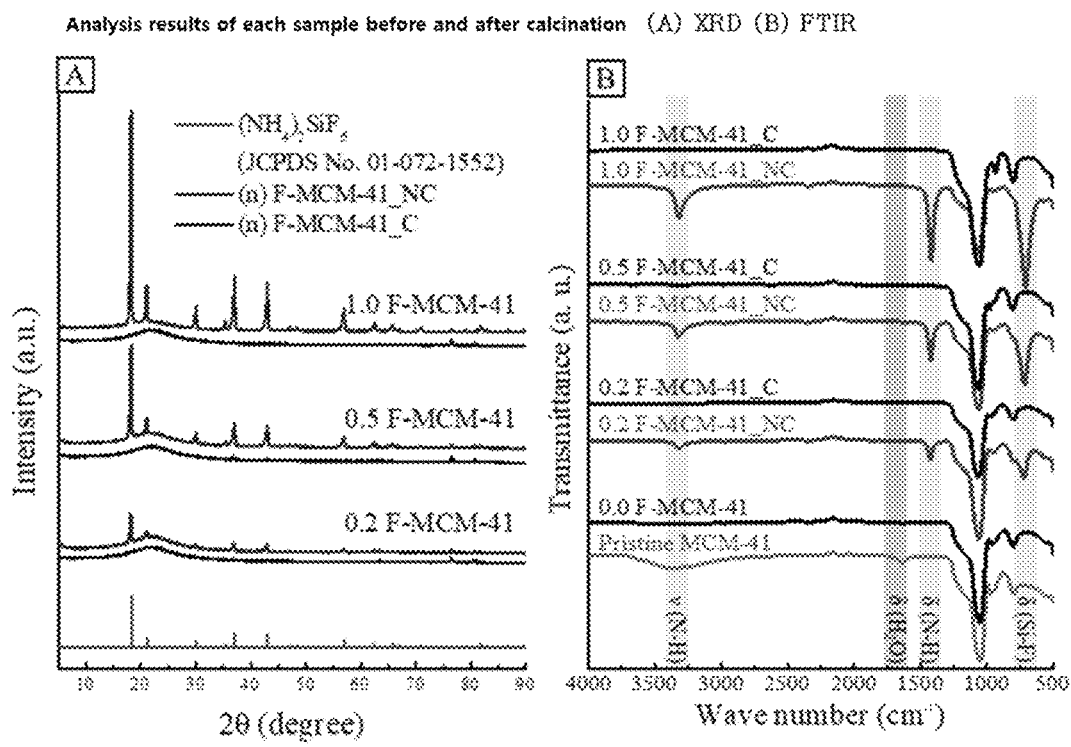

[FIG. 2]
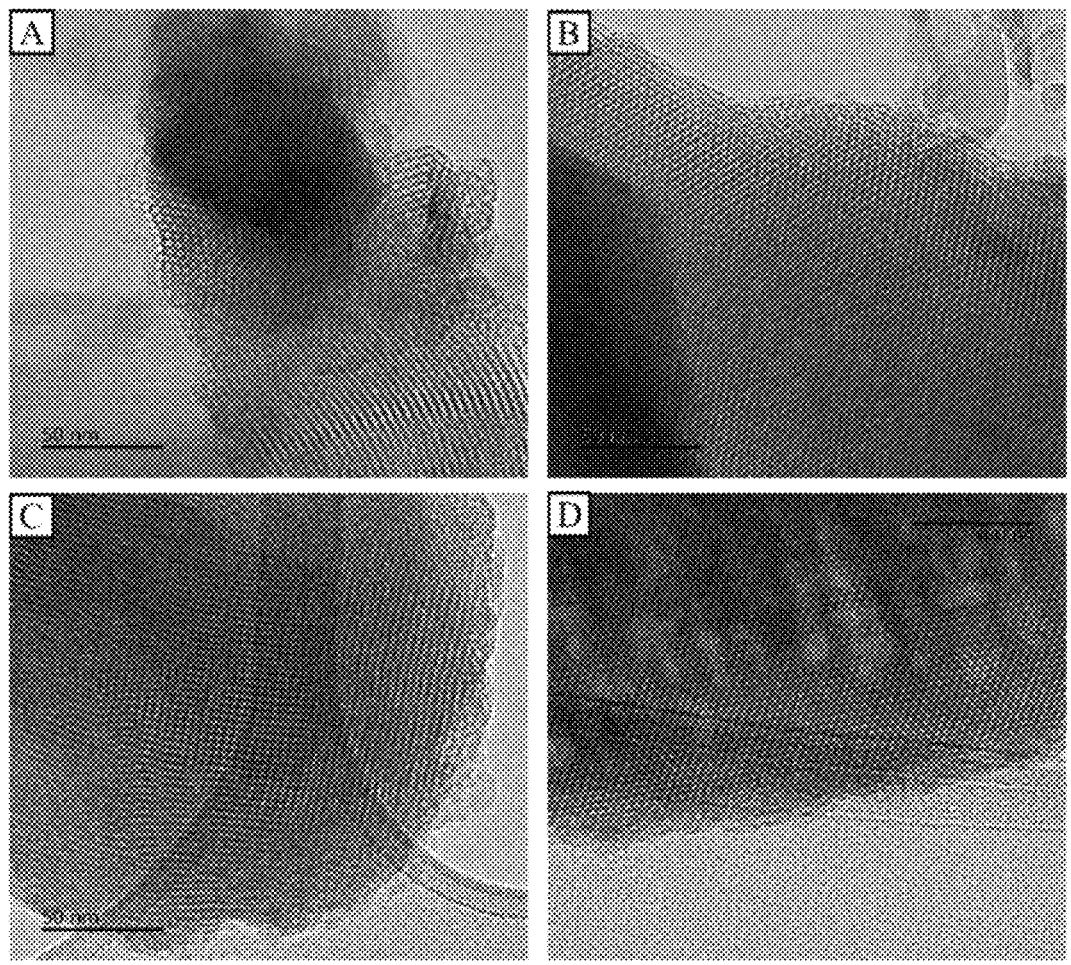
Transmission electron microscope(TEM) image of each adsorbent
(A) 0.0 F-MCM-41_NC  (B) 0.2 F-MCM-41_NC  (C) 0.5 F-MCM-41_NC
(D) 1.0 F-MCM-41_NC

[FIG. 3]
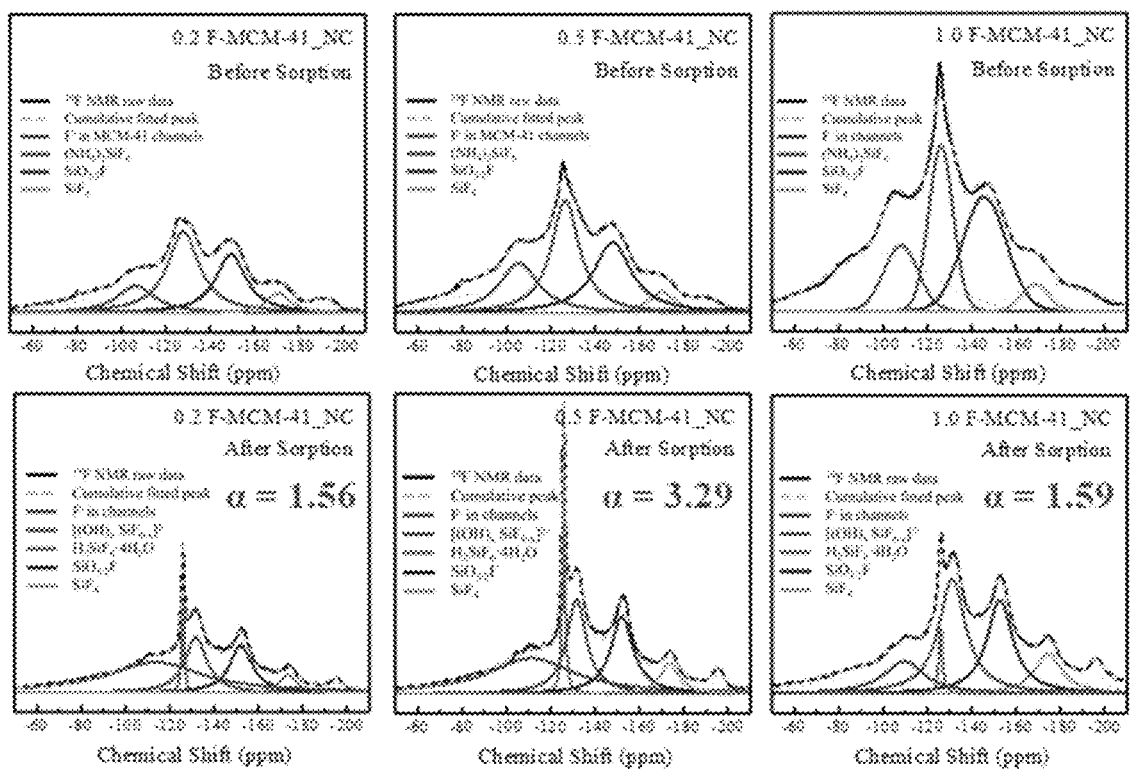

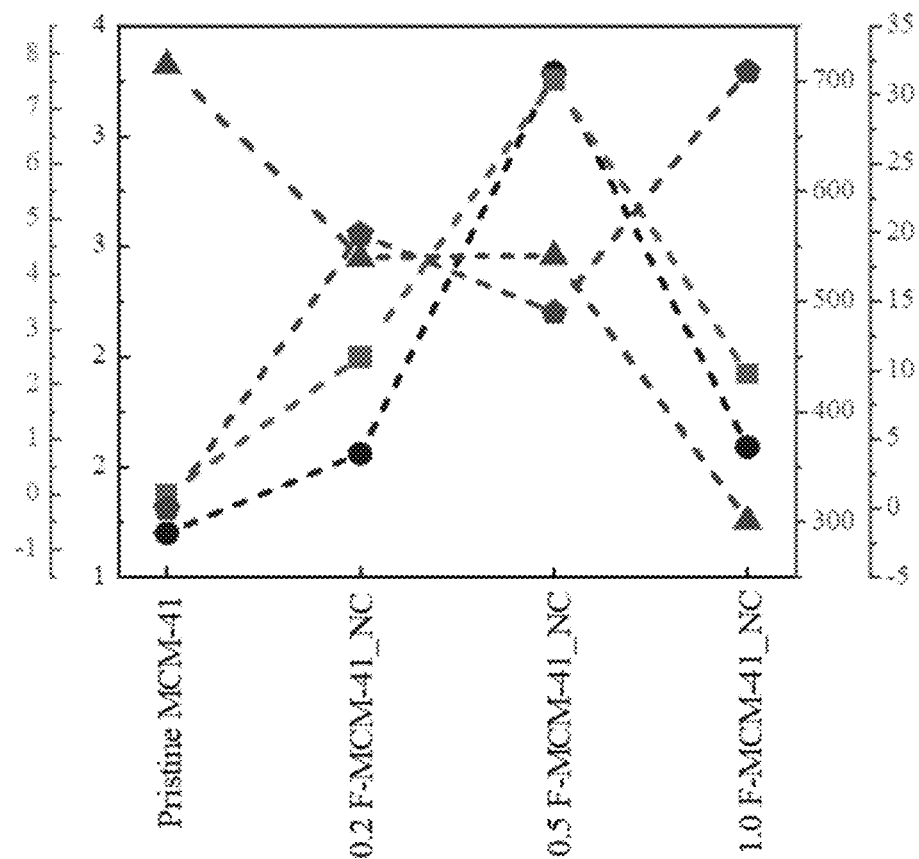

[FIG. 5]
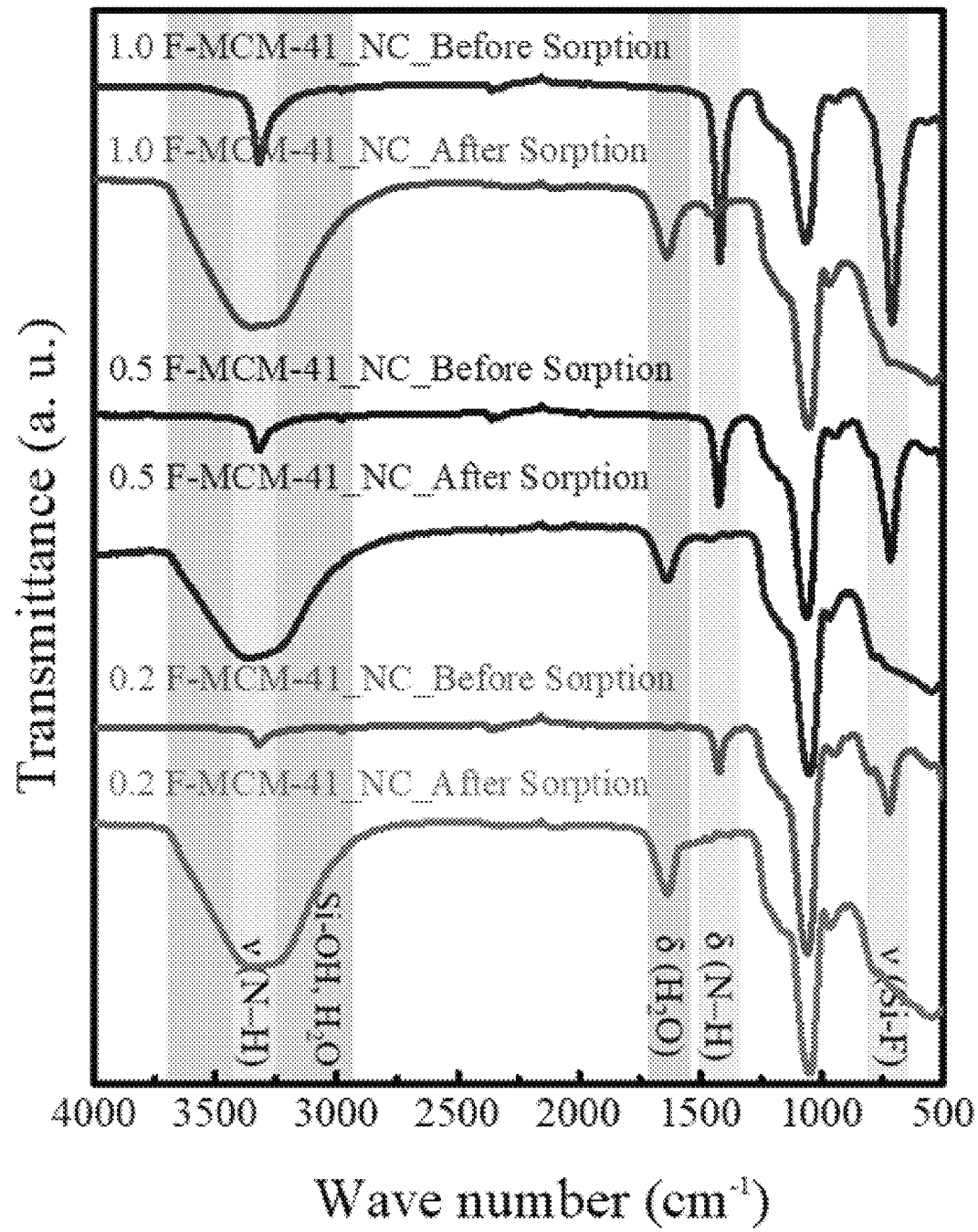

HYDROGEN ISOTOPE ADSORBENT WITH DIFFERENTIAL BINDING PROPERTIES TO HYDROGEN ISOTOPES, MANUFACTURING METHOD THEREOF AND METHOD FOR SEPARATING HYDROGEN

CROSS-REFERENCE TO RELATED APPLICATIONS

This application is a Divisional Applications of U.S. patent application Ser. No. 17/592,799 filed on Feb. 4, 2022, which claims the priority of Korean Patent Application No. 10-2021-0096843 filed on Jul. 23, 2021, in the Korean Intellectual Property Office, the disclosure of which is incorporated herein by reference.

BACKGROUND OF THE INVENTION

Field of the Invention

The present disclosure relates to a hydrogen isotope adsorbent with differential binding properties to hydrogen isotopes, a manufacturing method thereof, and a method for separating hydrogen isotopes using the same, and more particularly, to an adsorbent which is added to water to separate hydrogen isotopes included in water such as radioactive wastewater, tritiated water or deuterated water, a method for manufacturing the adsorbent, and a method for separating hydrogen isotopes included in water using the adsorbent.

Description of the Related Art

Tritium is hardly concentrated and separated to occupy most of the radioactive effluents of nuclear power plants and thus, the tritium is one of the most important nuclides in terms of radiation safety management of nuclear power plants. In addition, tritium generated from nuclear power plants is an important resource which may be used as a raw material for nuclear fusion power generation. Therefore, separation and enrichment of tritium from radioactive waste has been an important challenge for nuclear fusion and nuclear power industries.

As a method for separation of hydrogen isotopes, various techniques such as cryogenic distillation, palladium membrane diffusion, electrolysis, kinetic quantum sieving, chemical isotope exchange, and the like have been developed.

The techniques separate hydrogen isotopes by using a physical and chemical isotope effect caused by a mass difference of hydrogen isotopes. Judging from the achievements and applicability of tritium enrichment technology to date, the most promising method is based on chemical hydrogen isotope exchange reaction combined with electrolysis.

Among them, a Girdler-sulfide process using the chemical hydrogen isotope exchange reaction between liquid $H_2O$ and gaseous $H_2S$ and a combined electrolysis chemical exchange (CECE) process using the hydrogen isotope exchange reaction between $H_2$ gas and liquid $H_2O$ have been commercialized.

A current strategy for separation of hydrogen isotopes requires very high capital cost and operating cost, so that it is difficult to be applied to the treatment of a large amount of radioactive wastewater generated in a severe accident.

Such high operating cost is mainly due to the consumption of a lot of energy in an electrolysis process, a gas-liquid interface chemical exchange process, a cryogenic distillation process, and the like.

In addition, the CECE process uses an expensive Pt catalyst for the isotope exchange reaction, and the Girdler sulfide process has a limitation in that toxic hydrogen sulfide gas needs to be used as a reactant. For example, it is expected that a very long treatment period and astronomical cost will be required to decontaminate a huge amount of radioactive tritium wastewater generated during the Fukushima nuclear accident in 2011 by applying the technology secured so far.

Recently, studies on the separation of gaseous hydrogen isotopes using kinetic quantum sieving (KQS) have been actively conducted through new materials such as graphene oxide (GOx) and metal organic frameworks (MOF).

However, this kinetic quantum sieving is very energy intensive when applied to an actual separation process. because this can be utilized only at a cryogenic temperature around 77 K. In addition, in the case of water molecules, a difference in de Broglie wavelength ($\lambda$) caused by hydrogen isotopes is not large due to the influence of oxygen atoms. Therefore, it is very difficult to utilize the kinetic quantum sieving (KQS) effect in a solid-liquid interface reaction which needs to proceed at a relatively high temperature.

As such, a technology for separating hydrogen isotopes based on the kinetic quantum sieving (KQS) using recently developed graphene oxide (GOx), hexagonal boron-nitride (hBN), metal organic framework (MOF), and the like also remains at a basic research level.

In addition, all of conventional tritium separation techniques described above are limited to liquid-gas interfacial reaction (e.g., cryogenic distillation, chemical isotope exchange reaction, and electrolysis) or solid-gas interfacial reaction (e.g., palladium membrane diffusion, and physical quantum sieving).

All of these processes exploit hazardous gases (H2: flammable, and H2S: toxic, corrosive, and flammable) as reactants for isotope exchange reaction, which makes it difficult to control and operate. Additionally, tritium isotopologue gases are likely to diffuse rapidly, which causes environmental pollution and imposes radiological health risks on the human body. Tritium is mainly discharged from the system in the form of tritiated water (HTO) or tritium wastewater in which some of the hydrogen atoms of water molecules are substituted with tritium, and finally stored in a solid phase to be reused as fuel of a nuclear fusion reactor or solidified or immobilized to be disposed of as radioactive waste.

Therefore, it is necessary to develop a tritium separation technology using a solid-liquid interface reaction to separate tritium from radioactive waste without using toxic gaseous reactants, however, the research on the development of adsorbents for liquid tritium separation remains at a level of testing various existing adsorbents such as commercial zeolite, lithium ion sieve, and the like.

Since tritium separation factors of various commercial zeolite adsorbents evaluated so far are all evaluated to be 1.5 or less, the zeolite adsorbents have very low separation efficiency, and there is no method to separate tritium from tritiated water with high processing capacity and high separation efficiency to replace the existing CECE process.

Therefore, it is a very important worldwide issue to develop a new hydrogen isotope separation method with reduced operation costs, high processing capacity, high separation efficiency and that uses new hydrogen isotope separating materials.
(Patent Document 1) KR 10-1533977 B
(Patent Document 2) KR 10-0444257 B

SUMMARY OF THE INVENTION

In order to solve the problems in the related art, an object of the present disclosure is to provide a new high-efficiency adsorbent, a manufacturing method thereof, and a method for separating hydrogen isotopes using the same capable of separating hydrogen isotopes without using gaseous reactants while having a high processing capacity and a high hydrogen isotope separation factor.

In order to solve the problems in the related art, the present disclosure provides a hydrogen isotope adsorbent comprising mesoporous silica doped with fluorine.

Preferably, the mesoporous silica may be MCM-41.

In order to solve the problems in the related art, the present disclosure provides a method for separating hydrogen isotopes from water comprising adding an adsorbent to water including hydrogen isotopes, wherein the adsorbent may be mesoporous silica doped with fluorine.

Preferably, the mesoporous silica may be MCM-41.

Preferably, the temperature of the water may be 4 to 8° C. or 23 to 27° C.

Preferably, the temperature of the water may be 4 to 8° C.

In order to solve the problems in the related art, the present disclosure provides a manufacturing method of a hydrogen isotope adsorbent comprising (a) doping fluorine in mesoporous silica.

Preferably, the mesoporous silica may be MCM-41.

Preferably, step (a) may include (a-1) adding the MCM-41 and a fluorine compound to a solvent to generate a mixture; and (a-2) heat-treating the mixture.

Preferably, the solvent may be isopropanol.

Preferably, the fluorine compound may be ammonium fluoride ($NH_4F$).

Preferably, in step (a), the content of the fluorine compound may be 20 to 100 parts by weight with respect to 100 parts by weight of the MCM-41.

Preferably, in step (a), the content of the fluorine compound may be 40 to 60 parts by weight with respect to 100 parts by weight of the MCM-41.

Preferably, in step (a), 1.5 to 1.8 g of the MCM-41 per 100 mL of the solvent may be added.

Preferably, in step (a-2), the mixture may be first heat-treated at 100 to 140° C. for 20 to 28 hours, and then the mixture may be second heat-treated at 100 to 140° C. for 3 to 7 hours.

In order to solve the problems in the related art, the present disclosure provides a hydrogen isotope adsorbent manufactured according to the manufacturing method of the hydrogen isotope adsorbent.

In order to solve the problems in the related art, the present disclosure provides a method for separating hydrogen isotopes from water comprising adding the hydrogen isotope adsorbent manufactured according to the manufacturing method of the hydrogen isotope adsorbent to water including hydrogen isotopes.

Preferably, 40 to 60 g of the hydrogen isotope adsorbent per 1 L of the water may be added.

Preferably, the temperature of the water may be 4 to 8° C. or 23 to 27° C.

Preferably, the temperature of the water may be 4 to 8° C.

According to the present disclosure, it is possible to separate tritium or deuterium included in water such as radioactive wastewater, tritium water or deuterium water with significantly higher separation efficiency of hydrogen isotopes with reduced operating costs.

BRIEF DESCRIPTION OF THE DRAWINGS

FIGS. 1 to 5 are diagrams illustrating experimental results of adsorbents according to the present disclosure.

DETAILED DESCRIPTION OF THE PREFERRED EMBODIMENT

Hereinafter, preferred embodiments of the present disclosure will be described in detail with reference to the accompanying drawings. Further, terms to be described below, as terms which are defined in consideration of functions in the present disclosure may vary depending on the intention or custom of a user or an operator. Accordingly, definitions of the terms need to be described based on contents throughout this specification.

1. Manufacture of Hydrogen Isotope Adsorbent

Tritium, deuterium and light hydrogen are considered to be chemically identical in classical mechanics, but show different rates of chemical reactions depending on the mass of isotopes due to the difference in quantum mechanical zero point energy (ZPE). In general, binding sites with significant differences in bonding enthalpy ($\Delta H$) between hydrogen isotopes tend to preferentially bind to heavier isotopes.

This concept is also associated with a chemical isotope exchange reaction (e.g., Girdler sulfide; $H_2O \leftrightarrow H_2S$/CECE; $H_2H \leftrightarrow H_2O$) on which a currently commercialized hydrogen isotope separation process is based.

The separation of isotopes in such an isotope exchange reaction may be predicted through an isotopic reduced partition function (IRPF; s/s'f (T/H)) value. When hydrogen isotopes X (e.g., $^3H$, $^2H$, $^1H$) are distributed in two different chemical environments (e.g., $X_2O(l)$, X-A(s)), heavy hydrogen isotopes preferentially move toward a chemical environment having a higher IRPF(s/s'f (T/H)) value by an isotope exchange reaction, and it is generally known that in a chemical environment having a strong bond, an IRPF value is larger.

As can be seen in Table 1 below, according to the research results of Biseleisen and Mayer, since fluorine shows a high IRPF value in diatomic hydride (HX), it may be considered that an adsorbent bearing fluorine as a chemical reactant has differential binding properties to hydrogen isotopes, and is effective in separating hydrogen isotopes contained in water such as radioactive wastewater, tritiated water or deuterium water.

TABLE 1

| Isotopic reduced partition function of various diatomic hydrides (HX) | | |
|---|---|---|
| Molecule | s/s'f(T/H) | In s/s'f(D/H) |
| $H_2$ | 5.283 | 1.215 |
| HF | 28.50 | 2.359 |
| HCl | 18.52 | 1.669 |
| HBr | 7.935 | 1.469 |
| HI | 5.714 | 1.245 |

Therefore, in the present disclosure, an adsorbent capable of separating hydrogen isotopes contained in water such as radioactive wastewater, tritium water or deuterium water is manufactured by doping fluorine on the surface of MCM-41, a mesoporous silica material having a high surface area.

Representative mesoporous silica materials MCM-41, SBA-15, and KIT-6 have high potential as framework materials due to a large surface area. However, due to their low hydrothermal stability, the structure is easily broken during calcination, substitution, and ion exchange processes, resulting in the limitations to be used as a catalyst and an adsorbent.

Considering these characteristics, when a synthetic method requiring high heat treatment, such as hydrothermal synthesis and a sol-gel method, is selected, chemical species need to be functionalized using a solvent other than water.

Accordingly, isopropanol was used as a solvent, and basic ammonium fluoride ($NH_4F$) is used as a fluorine compound so that fluorine is easily doped on the surface of a mesoporous silica material MCM-41.

Specifically, various amounts of $NH_4F$ (n=0.0 g, 0.2 g, 0.5 g, and 1.0 g) were added to 1 g of MCM-41 in 60 mL of isopropanol at 25° C., and the mixture was vigorously stirred for 1 hour.

Thereafter, the generated mixture was first heat-treated at 120° C. for 24 hours. In this process, isopropanol is gradually removed from the synthesis mixture by evaporation due to heating, thereby increasing the concentration of fluorine in the synthesis mixture.

Then, the generated solid product was mixed well and second heat-treated again at 120° C. for 5 hours.

MCM-41 that was not subjected to the above-described synthesis process was denoted as Pristine MCM-41, each MCM-41 adsorbent doped with different amounts of fluorine was denoted as (n)F-MCM-41_NCs (0.0F-MCM-41_NC is added to a solvent and subjected to the synthesis process without adding a fluorine compound), and MCM-41 in which each (n)F-MCM-41_NCs is calcined at 250° C. for 5 hours was denoted as (n)F-MCM-41_C.

2. Adsorption Experiment

The separation performance of an adsorbent developed to separate hydrogen isotopes contained in water such as radioactive wastewater, tritium water or deuterium water was evaluated through a batch experiment using 10000 Bq/mL of deionized tritium water (solid to solution ratio=50 g/L), and the isotope separation factor was evaluated through Equation 1 below.

$$\alpha = \frac{[T/H]_{F-MCM-41}}{[T/H]_{water}} \cong \frac{\left[\frac{HTO}{H_2O}\right]_{F-MCM-41}}{\left[\frac{HTO}{H_2O}\right]_{water}} = \frac{\frac{c_0 V_i - c_e V_e}{V_{ads}}}{\frac{c_e V_e}{V_e}} \quad \text{[Equation 1]}$$

3. Experimental Result

Referring to Table 2, as a result of the batch experiment, fluorinated 0.5F-MCM-41_NC shows a significantly improved tritium isotope separation factor ac as compared to Pristine MCM-41, and both materials show higher tritium isotope separation factors ($\alpha_{Pristine,\ 25°\ C.}$=1.03, $\alpha_{Pristine,\ 6°\ C.}$=1.20, $\alpha_{0.5F,\ 25°\ C.}$=1.20, and $\alpha_{0.5F,\ 6°\ C.}$=3.29) at low temperature conditions. This indicates that an isotope-selective chemically active site is formed by fluorine doping, and the formed chemically active site can more efficiently separate tritium under low-temperature conditions.

TABLE 2

Tritium separation performance of adsorbent before and after fluorine doping under two temperature conditions

|  | Temperature [° C.] | Removal efficiency [%] | Sorption performance [Bq/g] | Isotope separation factor[-] | After reaction pH | Liquid fluorine concentration after reaction [mmol] |
|---|---|---|---|---|---|---|
| Pristine MCM-41 | 25 | 0.04 | 170 | 1.03 | 5.67 | 0 |
|  | 6 | 0.58 | 1181.11 | 1.20 | 5.61 | 0 |
| 0.5F-MCM-41_NC | 25 | 0.09 | 646.67 | 1.20 | 2.56 | 2.254 |
|  | 6 | 3.94 | 7726.67 | 3.29 | 2.55 | 2.595 |

According to the X-ray diffraction (FIG. 1A), Fourier transform infrared spectroscopy (FIG. 1B), and solid-state $^{19}F$ MAS NMR results (FIG. 3), a main chemical species of (n)F-MCM-41_NCs is $(NH_4)_2SiF_6$. Moreover, with the increasing concentration of $NH_4F$ in the synthesis mixture, each signal shows higher intensity. In addition, the X-ray fluorescence (XRF) analysis result shows that the fluorine weight percent of 0.2F-MCM-41_NC, 0.5F-MCM-41_NC, and 0.5F-MCM-41_NC is 8 wt %, 19 wt %, and 32 wt %, respectively.

Referring to Table 3, isotope separation factors evaluated through an equilibrium batch adsorption experiment using Pristine MCM-41, 0.2F-MCM-41_NC, and 0.5F-MCM-41_NC show positive correlation with the content of $(NH_4)_2SiF_6$.

TABLE 3

Tritium separation performance of adsorbent according to content of $(NH_4)_2SiF_6$

| 6° C, 2d | Removal efficiency [%] | Sorption performance [Bq/g] | Isotope separation factor [-] | After reaction pH | Liquid fluorine concentration after reaction [mmol] |
|---|---|---|---|---|---|
| Pristine MCM-41 | 0.58 | 1181.11 | 1.20 | 5.61 | 0 |
| 0.2 F-MCM-41_NC | 1.35 | 2686.67 | 1.56 | 1.85 | 1.078 |
| 0.5 F-MCM-41_NC | 3.94 | 7726.67 | 3.29 | 2.55 | 2.595 |

TABLE 3-continued

Tritium separation performance of adsorbent according to content of $(NH_4)_2SiF_6$

| 6° C, 2d | Removal efficiency [%] | Sorption performance [Bq/g] | Isotope separation factor [-] | After reaction pH | Liquid fluorine concentration after reaction [mmol] |
|---|---|---|---|---|---|
| 0.5 F-MCM-41_C | 0.24 | 290.00 | 1.06 | 2.01 | — |
| 1.0 F-MCM-41_NC | 0.93 | 1840.00 | 1.59 | 2.85 | 3.861 |

In order to evaluate an effect of $(NH_4)_2SiF_6$ on the tritium separation efficiency, the tritium isotope separation factors were comparatively tested before and after calcination at 250° C. In 0.5F-MCM-41_C after calcination, $(NH_4)_2SiF_6$ is decomposed into gaseous states ($NH_3$, HF, and $SiF_4$) and fully removed (FIG. 1), and the tritium isotope separation factor is also reduced from 3.29 before calcination to 1.06 after calcinations (Table 3) This suggests that the presence of $(NH_4)_2SiF_6$ is closely related with tritium separation.

However, 1.0F-MCM-41_NC showed a lower tritium isotope separation factor than 0.5F-MCM-41_NC despite a higher content of $(NH_4)_2SiF_6$ ($\alpha_{1.0F, 6° C.}$=1.59). This is because a large amount of fluorine is dissolved in a solution during the sorption reaction with tritium as a pore structure of MCM-41 is damaged during the synthesis process of 1.0F-MCM-41_NC.

Referring to Table 4, as a result of $N_2$ adsorption desorption analysis, 0.2F-MCM-41_NC and 0.5F-MCM-41_NC are observed to have very similar BET surface areas of about 540 m²/g, but 1.0F-MCM-41_NC shows significantly the reduced BET surface area to 300 m²/g, indicating partial destruction of the MCM-41 pore structure.

TABLE 4

Pore characteristics of each adsorbent using results of nitrogen adsorption desorption analysts

| | Pore diameter [nm] | Pore volume [cm² g⁻²] | BET Suface area [m² g⁻¹] |
|---|---|---|---|
| Pristine MCM-41 | 2.3020 | 0.5818 | 714.50 |
| 0.0 F-MCM-41_NC | 2.3020 | 0.6264 | 774.79 |
| 0.2 F-MCM-41_NC | 2.6572 | 0.4908 | 540.07 |
| 0.5 F-MCM-41_NC | 2.6540 | 0.4183 | 541.49 |
| 1.0 F-MCM-41_NC | 3.0671 | 0.2727 | 301.49 |

The destruction of such a pore structure is also confirmed by the result of TEM analysis FIG. 2. According to previous studies about a fluorine doping mechanism of other silica materials, fluorine doping is performed by formation of octahedral fluorosilicate species by the fluorinative opening of the siloxane bridge on the silica surface.

Since the opening of the siloxane bridge makes the pore wall of MCM-41 thin, the pore structure of MCM-41 may be partially destroyed when an excessive amount of $NH_4F$ is present in the synthesis mixture as in the synthesis process of 1.0F-MCM-41_NC.

In addition, according to a result of quantitative analysis through the integrate signal of solid-state $^{19}$F MAS NMR (FIG. 3), the pore structure integrity of MCM-41 represented by BET surface area and a ratio of dissolved fluoride show a negative correlation (FIG. 4), and in the case of 1.0F-MCM-41_NC, a solid-state 19F MAS NMR signal assigned to fluoride adsorbed in the pores after the reaction is significantly reduced, unlike other adsorbents (FIG. 3).

This means that as the pore structure of 1.0F-MCM-41_NC is damaged by the synthesis process, the solid-state fluorine retention capacity is reduced, and a large amount of fluorine is dissolved in the solvent during the reaction with tritium.

The above results suggest the importance of not only the content of $(NH_4)_2SiF_6$ but also the integrity of the MCM-41 pore structure and the dissolution amount of fluorine according to structural damage when separating tritium. 0.5F-MCM-41_NC presents an excellent compromise between the amount of isotope-selective chemically active sites and the dissolution amount of fluorine according to the integrity of the MCM-41 pore structure. The tritium isotope separation factor ($\alpha_{0.5F, 6}$° C.=3.29) of 0.5F-MCM-41_NC is much higher than that of the chemical isotope exchange reaction ($\alpha$=2.33; $H_2O(l)+HDS(g) \leftrightarrow HDO(l)+H_2S(g)$) of the Girdler sulfide process, and comparable to that of the chemical isotope exchange reaction ($\alpha$=3.7; $H_2O(l)+HD(g) \leftrightarrow HDO(l)+H_2(g)$) of the CECE process, which shows the highest efficiency and processing capacity among existing separation processes.

FTIR spectra (FIG. 5) and solid-state $^{19}$F MAS NMR analysis results (FIG. 3) before and after the experiment indicate that the chemical hydrogen isotope exchange reaction at F . . . OH hydrogen bonding sites following the ion exchange reaction between $NH_4^+$ and $H_3O^+$ in $(NH_4)_2SiF_6$ is a main tritium separation mechanism of (n)F-MCM-41_NC.

After the reaction, all (n)F-MCM-41_NCs show an upfield shifting of the $^{19}$F MAS NMR signal about −5 ppm (FIG. 3), and according to previous studies, this indicates a change in coordination environment of $^{19}$F nucleus by a complexation reaction of fluorine with $H_3O^+$ or $H^+$ and the formation of F . . . OH hydrogen bond interaction.

FTIR analysis results before and after the reaction of (n)F-MCM-41_NCs (FIG. 5) show that $NH_4^+$ ions of $(NH_4)_2SiF_6$ were exchanged with $H_3O^+$ through the reaction with tritium, and accordingly, it is known that generated $H_2SiF_6 \cdot 4H_2O$ crystals are formed by F . . . OH hydrogen bonds.

In addition, even in the solid-state $^{19}$F MAS NMR analysis result after the reaction of (n)F-MCM-41_NCs, a new octahedral species (−125 ppm) allocable to $H_2SiF_6 \cdot 4H_2O$ crystals is formed (FIG. 3), and the ratio of an integrated signal area of a peak corresponding to $H_2SiF_6 \cdot 4H_2O$ shows a positive correlation with the tritium isotope separation factor of (n)F-MCM-41_NCs (FIG. 4).

Therefore, it may be concluded that the chemical isotope-selective exchange reaction at the F . . . OH hydrogen bonding site with the formation of H2SiF6·4H2O from (NH4)2SiF6 is a main tritium separation mechanism of (n)F-MCM-41_NCs developed in the present study.

Therefore, as can be seen from the experiments, (n)F-MCM-41_NCs according to the present disclosure have high tritium separation. efficiency (hydrogen isotope separation factor: 3.29) as being comparable with the chemical isotope exchange reaction of the CECE process with the highest efficiency and processing capacity among existing separation processes. As a result, it is natural that hydrogen isotopes included in water such as radioactive wastewater, tritiated water or deuterium water may be separated with high processing capacity and efficiency by using (n)F-MCM-41_NCs according to the present disclosure.

Hereinabove, in this specification, although the present disclosure has been described with reference to the embodiments illustrated in the drawings so as to be easily understood and reproduced by those skilled in the art, it is just illustrative, and it will be understood to those skilled in the art that various modifications and other equivalent embodiments can be made from the embodiments of the present disclosure. Therefore, the scope of the present disclosure should be determined by the appended claims.

What is claimed is:

1. A method for separating hydrogen isotopes from water comprising adding an adsorbent to water including hydrogen isotopes,
   wherein the adsorbent is mesoporous silica doped with fluorine.
2. The method for separating hydrogen isotopes from water of claim 1, wherein the mesoporous silica is MCM-41.
3. The method for separating hydrogen isotopes from water of claim 2, wherein 40 to 60 g of the adsorbent per 1 L of the water is added.
4. The method for separating hydrogen isotopes from water of claim 2, wherein the temperature of the water is 4 to 8° C. or 23 to 27° C.
5. The method for separating hydrogen isotopes from water of claim 4, wherein the temperature of the water is 4 to 8° C.

* * * * *